United States Patent [19]

Plotto

[11] 4,225,891
[45] Sep. 30, 1980

[54] FLY OFF PLATFORM FOR MAGNETIC TRANSDUCERS HAVING MEANS FOR REDUCING UNSTICK TIME

[75] Inventor: Michel Plotto, Paris, France

[73] Assignee: Compagnie Internationale pour l'Informatique, Paris, France

[21] Appl. No.: 958,839

[22] Filed: Nov. 8, 1978

[30] Foreign Application Priority Data

Nov. 15, 1977 [FR] France .................................. 77 34346

[51] Int. Cl.² .............................................. G11B 5/60
[52] U.S. Cl. ..................................... 360/103; 360/122
[58] Field of Search ................................ 360/103–104, 360/122, 128–129, 130; 204/192 E

[56] References Cited

U.S. PATENT DOCUMENTS

| | | | |
|---|---|---|---|
| 3,657,710 | 4/1972 | Billawala | 360/103 |
| 3,678,482 | 7/1972 | Billawala | 360/103 |
| 3,855,625 | 12/1974 | Garnier et al. | 360/103 |
| 4,081,846 | 3/1978 | Roscamp et al. | 360/103 |

*Primary Examiner*—John H. Wolff
*Attorney, Agent, or Firm*—Kerkam, Stowell, Kondracki & Clarke

[57] ABSTRACT

A fly off transducer platform or carrier according to the invention comprises a carrier for supporting at least one read/write transducer for a data carrier and at least one skid defining a flight surface comprising a first surface which provides the said platform with its lift when it is flying above the said data carrier and a second, bevelled surface situated at the front of the flight surface with reference to the direction of movement of the data carrier in relation to the transducer carrier. The bevelled surface includes a rim at the leading edge thereof, and said rim, transversely to the said direction of movement, is greater at the front edge of the said bevelled surface than its rear such that an increased bevel surface area is provided to enhance lift.

4 Claims, 7 Drawing Figures

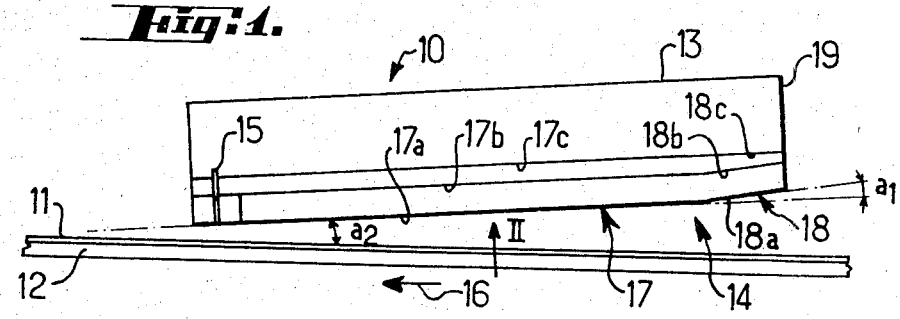
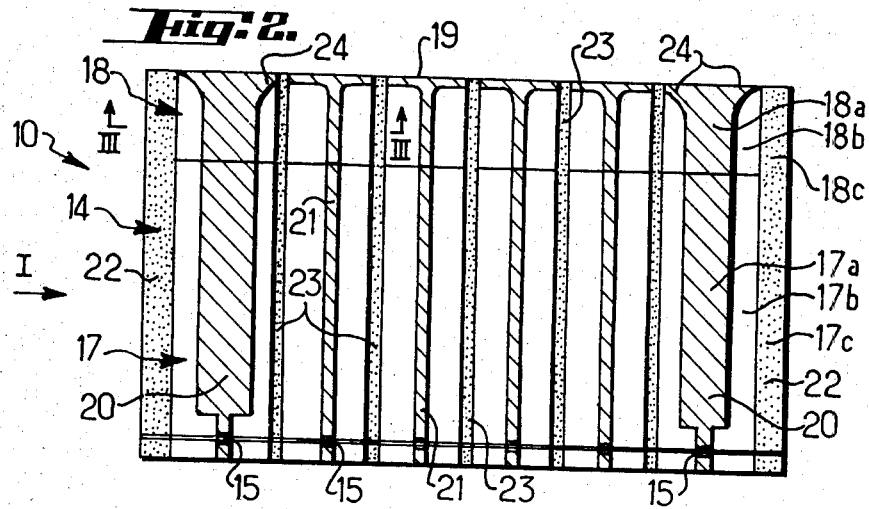
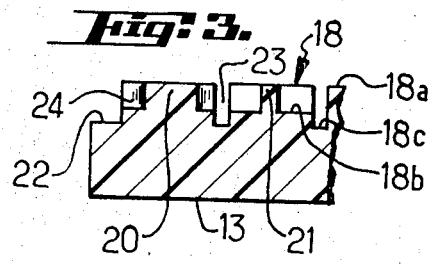
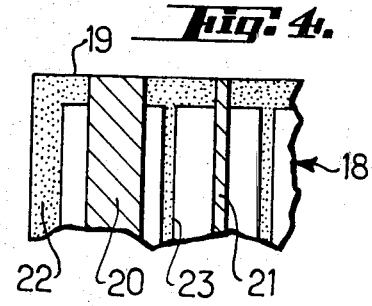
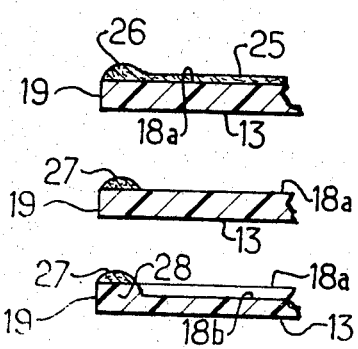

FLY OFF PLATFORM FOR MAGNETIC TRANSDUCERS HAVING MEANS FOR REDUCING UNSTICK TIME

CROSS REFERENCE TO RELATED APPLICATIONS

The present invention may be employed in combination with the transducer carrier or platform which is the subject matter of commonly-assigned copending application, Ser. No. 035,482, filed May 3, 1979 by Michel Plotto; and Ser. No. 882,592 filed Mar. 2, 1978 by Jean Pierre Lazzari et al.

BACKGROUND OF THE INVENTION

This invention relates to a method of reducing the unstick time of a fly off platform or carrier incorporating at least one magnetic transducer for reading from and/or writing on to a data carrier, to a platform resulting from putting this method into practice, and to a method of manufacturing such a platform. It is applicable in particular to a magnetic read/write transducer for magnetic peripherals of data processing systems, in particular disc memories.

Description of the Prior Art

In present-day data processing systems, more and more frequent use is being made of magnetic disc memories, by reason of their storage capacity and the relatively short time which is taken by the magnetic read/write transducers to access data combined anywhere on the discs from the time when the transducers receive an order to access this data from the said processing system.

It is known that magnetic discs carry data in concentric circular recording tracks whose radial width does not exceed a few hundredths of a millimeter and which generally cover the major part of both faces of the discs.

In operation, the discs are rotatably driven at constant speed by an electric motor. To enable data to be written on and read from a disc, magnetic transducers are arranged a distance of a few $\mu m$ above both faces of the discs. The usual present day practice is to associate a single platform or carrier provided with one or more transducers with each face of a disc. A carrier fitted with a plurality of transducers becomes necessary when it is desired to achieve a substantial reduction in the time taken by any transducer to access any item of data contained on the face of the disc.

The transducers used are generally magnetic transducers containing a magnetic circuit which has an air gap and a winding arranged around it. The air gap enables data to be read from and written onto the disc. Generally, but not exclusively, carriers having one or more transducers are in the form of relatively shallow rectangular parallelepiped whose major face adjacent the disc, termed the lower face, contains the air gaps of the transducers. The opposite major face, termed the upper face, contains the electrical points and wires which enable the windings of the transducers to be connected to the electrical circuits of the disc memory with which they which they are associated.

When the transducers of an associated platform are not performing the operations of reading or writing data from or onto the associated face of the disc, the platform occupies a so-called "rest" position in relation to the disc which is different from that which it occupies during reading or writing.

Among the various kinds of platforms of this nature, the platforms to which the invention relates are those widely referred to as "unstick from contact" or "fly off" transducer platforms or carriers. These types of platforms are being more readily accepted and more widely used in the industry. In the rest position (the disc being stationary) part of their lower major face, which face is termed the flight surface, rests on the associated face of the disc. The flight surface has a first part, termed the main flight surface, which takes the form of skids which rest on the disc when it is stationary, and a second part in the form of a bevel which is inclined in relation to the skids and which is situated at the "front" of the platform. Conventional usage defines the "front" of the flight surface as that part of the surface which, when the face of the magnetic disc associated with the platform is travelling past the flight surface, is the first in time to have pass before it the data on this face of the disc. Similarly, the part of this surface which is the last in time to have the same data pass before it is termed the rear of the flight surface. These definitions will be used throughout the instant specification and claims. The air gaps of the transducers are situated at the rear of the flight surface and carried by the skids.

When it is desired to cause the transducer platform to move from its rest position to its flying position above the face of the associated magnetic disc, it is merely necessary to set the disc in rotation. After a fairly short period, the platform rises by virtue of the lifting effect created by the bevel and rotation of the disc. When the disc reaches its nominal speed of rotation, the platform is in the flying position. The surface of the skids are inclined relative to the face of the disc, and this imparts to the carrier sufficient lift for it to fly stably above the disc. The platform is thus enabled to fly by the lift from the skids.

Platforms of this kind have an unstick time. Although this unstick time is only of the order of a few milliseconds, because of the repeated nature of separations, after a certain number of unsticks the flight surface of the platform and the corresponding face of the disc suffer damage because of the wear on them caused by the mechanical friction between them. To reduce this wear, and if possible to eliminate it, it is necessary to reduce the unstick time of such platforms, i.e. to minimize the tendency of the carrier to stick to the disc.

The solutions found hitherto for this problem have the drawback of being complicated and costly. As an example, one of them consists in increasing the acceleration of the data carrier when starting up.

The solution which forms the subject of the invention has the advantage of being simple and easy to put into practice and yet of being inexpensive. In the case of platforms having integrated read hands, putting it into practice even has the convenient feature of not requiring an additional treatment operation.

SUMMARY OF THE INVENTION

According to the present invention, the unstick time of a fly off platform which includes at least one read/write transducer for a data carrier and which presents to this carrier a flight surface comprising a first surface which provides the platform with its lift when it is flying above the data carrier and a second, bevelled surface which is situated at the front of the flight surface with reference to the direction of movement of the carrier in relation to the platform, is reduced by increasing the area of the said bevelled surface with a view to increasing lift when the said carrier unsticks or separates from the disc.

In a preferred embodiment of the invention, the fly off platform supports at least one read/write transducer for a data carrier and presents to this carrier a flight surface comprising a first surface which provides the platform with its lift when it is flying above the data carrier and a second, bevelled surface which is situated at the front of the flight surface with reference to the direction of movement of the said carrier in relation to the platform and which is provided with at least one skid. The dimensions of the said skid where the bevelled surface is situated are greater at the front of the said bevelled surface that at its rear, i.e. the skid is widened out close to the front edge.

The invention is particularly advantageous for a platform or carrier having a plurality of integrated magnetic read/write transducers. Such transducers are well known and are described, for example, in U.S. Pat. Nos. 3,723,665 and 3,846,841, the subject matter of which is hereby incorporated by reference.

In the case of such a platform having integrated transducers, a method of producing it with a view to bringing it into conformity with the invention could advantageously consist in forming the said bevelled surface by ion etching, and then in removing the edge portions of the said bevelled surface which have not been subject to the said ion etching, and preserving at least part of those edge portions which are situated at the front of the said bevelled surface.

BRIEF DESCRIPTION OF THE DRAWINGS

The features and advantages of the invention will be more clearly apparent from the following description, which is given with reference to the accompanying drawings. In the drawings:

FIG. 1 is a side view, looking in the direction of the arrow I shown in FIG. 2, of an embodiment of platform or carrier according to the invention which incorporates a plurality of magnetic read/write transducers and which is arranged above a magnetic disc, FIG. 2 is a view from below, looking in the direction of the arrow II shown in FIG. 1, of the platform shown in that figure, FIG. 3 is a partial section, on the line III—III, of the platform shown in FIG. 2, FIG. 4 is a partial view from below, corresponding to the part shown in FIG. 3, of a prior art platform, and FIGS. 5A, 5B and 5C are partial schematic sectional views of one edge of the platform, to illustrate the method of producing a platform according to the invention.

DESCRIPTION OF THE PREFERRED EMBODIMENTS

In the embodiment of the invention show in FIGS. 1, 2 and 3, the platform 10 cooperates with tracks 11 on a magnetic disc 12 which forms a data carrier, and it is formed by a rectangular, substantially parallelpiped body 13, whose face 14 adjacent the disc 12 forms the flight surface of the platform. In the illustrated embodiment, the platform 10, which in general terms may include at least one magnetic read/write transducer, includes six transducers, as indicated by the six air gaps 15 in the drawings.

In FIG. 1, the platform or carrier 10 is shown in the position in which it flies above the disc 10 when the latter is moving in the direction of arrow 16. Using this arrow as a reference, it may be said that the air gaps 15 are arranged at the rear of the platform 10.

As shown in FIG. 1, the flight surface 14 consists of two parts or surfaces which extend in differently inclined planes, namely a first surface 17 which provides the platform with lift when it is flying above the disc, which thus forms the main lifting surface for flight and which carries the air gaps 15 in its rear part, and a second, bevelled surface 18 which forms the unstick surface of the platform and which is situated in between the main flight surface 17 and the leading or front edge 19 of the platform 10 with reference to the direction of movement 16 of the disc. The angle $a_1$ of the bevel 18 relative to the main flight surface 17 is in fact very small, for example, of the order of 0.5 milliradians, and has therefore been exaggerated in FIG. 1 to clarify the drawing.

As is apparent from FIGS. 1 to 3, the main flight surface 17 and the bevelled surface 18 break down into a plurality of parts which lie in three different planes a, b and c. The outer planes 17a, 18a are represented by hatching in FIG. 2 and form the lifting surface of the platform 10, whose parts form what are termed "skids". The base planes 17b, 18b are set back at a given distance from the outer planes 17a, 18a and are left white in FIG. 2. The inner planes 17c, 18c are set back from the base surfaces 17b and 18b, are co-planar in the embodiment selected, and are indicated in FIG. 2 by dotted areas.

The skids which define the flight surface of the platform 10 consist of two main outer skids 20 which extend in the lengthwise direction of the platform as indicated by arrow 16 and which of considerable width, and of four auxiliary skids 21 which are parallel to the main skids 20 but of lesser width. These intermediate skids 21 are provided to bring the air gaps 15 into close proximity with the tracks 11 on the disc 12, in the same way as the main skids 20 and as is shown in FIG. 1. The plane 17c, 18c, is defined by two lateral terminal grooves 22 and intermediate grooves 23 which are formed in the base surfaces 17b, 18b to reduce the lift from these surfaces.

When the disc 12 is stationary, the platform 10 is in contact with the disc 12 via its surface 17a. As soon as the disc starts to rotate, the bevelled surface 18a forms a lifting surface for unstick which enables the carrier or platform 10 to draw away from the disc 12, i.e. the natural tendency for the platform 10 to stick to the surface of the disc 12 is broken so that the platform may be supported on a cushion of air between the disc and the surface 17. In flight, the platform 10 is supported in essence by the main lifting surface 17a for flight, which forms an angle $a_2$ of the order of 0.1 milliradians with the disc 12, which places the air gaps 15 at approximately 0.5 $\mu$m from the tracks 11 and the front end of the bevel 18, at the point where the edge 19 is situated, at approximately 5 $\mu$m, where the length of the platform is approximately 4 mm. The base surfaces 17b, 18b make only a very small contribution to the lift of the platform 10, and do so to an even smaller extent by reason of the intermediate grooves 23 which divide up the lifting area of the base surfaces 17b and 18b.

In the prior art, the main skids 20 and intermediate skids 21 were uniformly straight for their entire length, both on the main flight surface 17 and on the bevelled surface 18, as is shown in FIG. 4.

In accordance with the invention, a reduction in the unstick time of the platform 10 is achieved by increasing the area of the lifting surface 18a. This serves to improve or increase the lift which the platform 10 has at the time of separation. In the embodiment which is illustrated in FIGS. 2 and 3, the increase in the area of the skids 20, 21 in the bevelled region 18 is achieved by widening the skids towards the front of the outer surface 18a. The additional area is indicated by reference numeral 24 in the drawings.

In certain cases the widening of the skids could be achieved by physical or chemical action. However, when the surfaces 17 and 18 of the platform 10 which face the disc 12 are formed by ion etching, as is generally the case with platforms having integrated magnetic transducers, the additional area 24 is of course formed in the course of the ion etching.

FIGS. 5A, 5B and 5C explain how the additional area 24 is formed at the time of the ion etching. At the beginning, the first and second surfaces 17 and 18 of the flight surface 14 are uniformly plane and corresponded in level to planes 17a and 18a. For the purpose of forming the base planes 17b and 18b, the initial plane surfaces 17a and 18a (only the bevelled surface 18a being shown in FIGS. 5A to 5C given that the invention applies only to the bevelled surface 18) are uniformly covered with a photo-sensitive wax 25. The wax 25 may be caused to spread uniformly by centrifuging, for example, as is generally the case. Because of the edge effect, a ridge of wax 26 forms along all the outer edges of the surfaces 18 and 17 of the platform 10. After masking and sensitizing of the wax 25 to expose the surfaces (17b, 18b) to be excavated, the wax is selectively removed by chemical etching. In practice, however, the chemical etching is unable to remove the ridge 26 and after the etching a loop of wax 27 (FIG. 5B) therefore remains along the whole of the edge of the platform 10. When the ion etching takes place, the loop 27 acts as a screen (FIG. 5C) and after the ion etching there is therefore a rim 28 which has not been etched. In the prior art, this rim was removed mechanically, as shown by the areas 22 in FIGS. 2 and 3, along with the whole of the front edge of the bevel 18, to produce the configuration shown in FIG. 4 where the skids 20 and 21 are straight along the whole of their major dimension. In accordance with the invention, however, this rim is left in place to form the additional area 24 which serves to increase the lift which the bevel 18 provides at unstick.

If required, it would, of course, be possible to remove at least part of the rim 28 between the intermediate skids 21. However, the presence of this rim between the intermediate skids 21 improves still further the lift from the bevel 18, which is mainly due to the widening of the main skids 20 at the front of the bevelled surface 18. The additional area 24 is exaggerated in FIG. 2 to show it up more clearly.

The grooves 23 are produced mechanically in the same way as the grooves 22 which result from the mechanical removal of the longitudinal rims created by the ion etching.

In general terms, the invention is in no way restricted to the embodiment which is described and illustrated and in fact covers all means which form technical equivalents of the means described, as well as combinations thereof if these are made within the scope of the invention as defined by the following claims.

I claim:

1. In an improved fly-off transducer platform having at least one read/write transducer for a data carrier and a flight surface comprising a first surface which provides the platform with its lift when it is flying above the said data carrier and a second, bevelled surface which is situated at the front of said flight surface with reference to the direction of movement of the data carrier in relation to the platform, the improvement comprising a rim along the leading edge of the bevelled surface, said rim, transversely to the direction of movement, being greater at the front edge of said bevelled surface than at its rear for increasing lift when the said platform unsticks.

2. A fly off transducer platform having at least one read/write transducer for a data carrier and at least one skid defining a flight surface having a first surface which provides the said platform with its lift when it is flying above the said data carrier and a second, bevelled surface situated at the front of the flight surface with reference to the direction of movement of the data carrier in relation to the transducer platform, said bevelled surface including a rim at the leading edge thereof, said rim, transversely to the said direction of movement, being greater at the front edge of the said bevelled surface than at its rear.

3. A fly off transducer platform as set forth in claim 1 wherein said bevelled surface includes, at the front, a rim which extends along at least part of the front edge of the said bevelled surface.

4. A fly off transducer comprising a platform, at least one read/write transducer for a data carrier carried by said platform, said platform having at least one skid defining a first flight surface for said platform adapted to provide the said platform with lift when it is flying above the said data carrier, a second bevelled surface situated at the front of the flight surface with reference to the direction of movement of the data carrier in relation to the transducer platform, the said flight surface having certain edge portions of the said flight surface removed and at least part of those edge portions which are situated at the front of said bevelled surface preserved so as to provide said bevelled surface with a rim which is greater at the front edge thereof, transversely to the direction of movement, than at the rear thereof.

* * * * *

UNITED STATES PATENT AND TRADEMARK OFFICE
CERTIFICATE OF CORRECTION

PATENT NO. : 4,225,891
DATED : September 30, 1980
INVENTOR(S) : Michel Plotto

It is certified that error appears in the above-identified patent and that said Letters Patent are hereby corrected as shown below:

[73] Assignee: "Compagnie Internationale pour L'Informatique" should be -- Compagnie Internationale pour L'Informatique CII-Honeywell Bull (Societe Anonyme) --.

Signed and Sealed this

Sixteenth Day of December 1980

[SEAL]

Attest:

SIDNEY A. DIAMOND

Attesting Officer

Commissioner of Patents and Trademarks